United States Patent [19]
Couch et al.

[11] 3,747,961
[45] July 24, 1973

[54] CONDUIT SYSTEM

[75] Inventors: Robert O. Couch, Wadsworth, Ohio; Donald K. Spalding, Bangor, Pa.

[73] Assignee: Ric-Wil, Incorporated, Brecksville, Ohio

[22] Filed: May 5, 1971

[21] Appl. No.: 140,561

Related U.S. Application Data

[63] Continuation of Ser. No. 848,389, July 14, 1969, abandoned.

[52] U.S. Cl. ................. 285/133 R, 285/47, 285/61
[51] Int. Cl. .............................................. F16l 47/00
[58] Field of Search ............. 285/47, 48, 50, 133 R, 285/138, 373, 293, 64, 61; 248/49, 56; 138/105, 106

[56] References Cited
UNITED STATES PATENTS

| | | | |
|---|---|---|---|
| 3,068,026 | 12/1962 | McKamey | 285/47 |
| 2,085,441 | 6/1937 | Murray et al. | 285/373 X |
| 2,325,464 | 7/1943 | Bannister | 285/133 R X |
| 2,546,533 | 3/1951 | Williamson | 138/108 X |
| 3,144,050 | 8/1964 | Maloney | 248/49 X |
| 3,184,958 | 5/1965 | Eaton | 285/47 |
| 3,224,795 | 12/1965 | Conley | 285/423 X |
| 3,246,917 | 4/1966 | Martin | 285/47 |
| 3,351,361 | 11/1967 | Martin | 285/47 |
| 3,439,945 | 4/1969 | Chambers et al. | 285/373 |

FOREIGN PATENTS OR APPLICATIONS

| | | | |
|---|---|---|---|
| 261,862 | 5/1968 | Austria | 285/47 |
| 1,296,898 | 6/1969 | Germany | 285/47 |

*Primary Examiner*—Dave W. Arola
*Attorney*—Watts, Hoffmann, Fisher & Heinke

[57] ABSTRACT

A prefabricated conduit system comprising a fluid-conducting pipe supported within and extending through a reinforced plastic casing, a conduit anchor for restricting longitudinal movement of the pipe, the anchor including a plate secured to the pipe and extending outwardly of the casing for engagement with a fixed support and a sealing and reinforcing sleeve secured to the plate and bonded to the casing, a seal for the end of the conduit including a plate connected to the end of the casing and a sealing and reinforcing sleeve secured to the plate and bonded to the casing, and a joint connection between adjacent sections of conduit including a reinforced plastic connector band bonded to the casings of the adjacent sections.

19 Claims, 12 Drawing Figures

INVENTORS.
ROBERT O. COUCH
DONALD K. SPALDING.
BY Watts, Hoffmann,
Fisher & Heinke
ATTORNEYS.

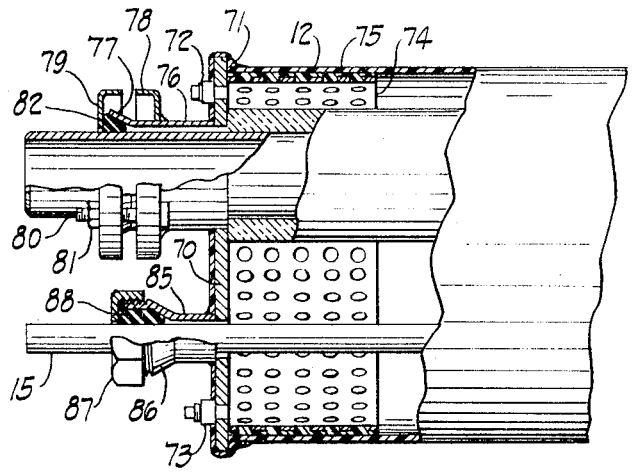
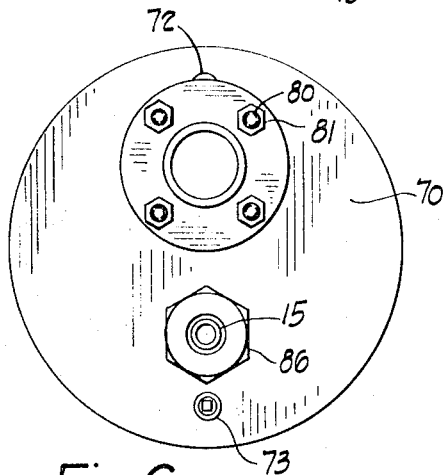
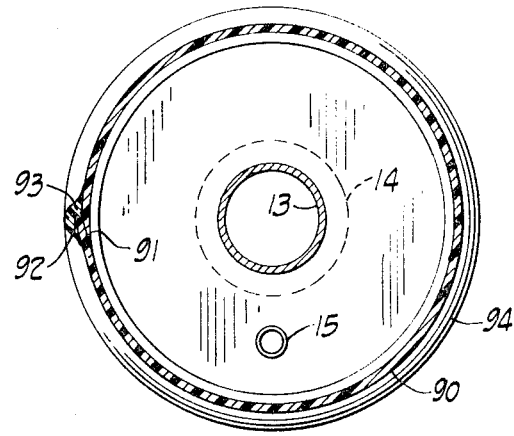
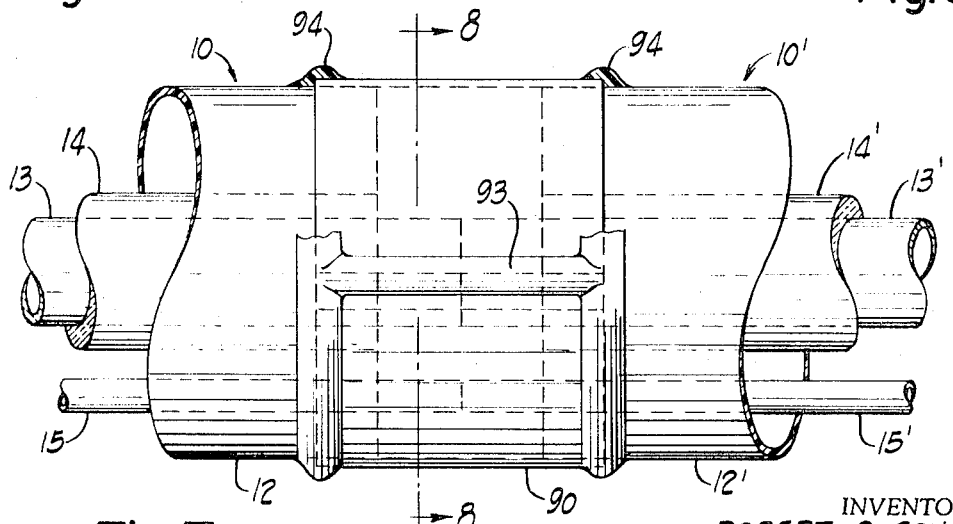

3,747,961

CONDUIT SYSTEM

CROSS-REFERENCE TO RELATED APPLICATION

This application is a continuation of U.S. Pat. application Ser. No. 848,389, filed July 14, 1969 and now abandoned.

BACKGROUND OF THE INVENTION

This invention relates generally to conduit systems, and more specifically to improvements in a prefabricated conduit construction of the type including a fluid-conducting pipe which is supported within and extends through an outer casing.

The invention is particularly concerned with conduit systems suitable for use in transporting fluids, such as steam, chilled water and the like, at temperatures differing from abient temperature. Such conduit systems are conventionally constructed of prefabricated sections, each of which includes at least one fluid conducting pipe supported within and extending through an outer casing. The conduit sections are fabricated at the factory and are connected together at the site of installation.

In use, the pipe of several sections are connected end-to-end to provide a continuous flow passage, and the surrounding casing sections also are connected. Since the pipes are subject to temperature variations when used to transport fluids such as steam and chilled water, suitable expansion absorbing structures, such as expansion loops or joints, elbows and tees are provided at spaced locations along the length of the conduit system. The connected pipes are firmly anchored against axial movement intermediate the expansion joints or expansion fittings to provide control of the expansion. In a subterranean installation, for example, the piping system is anchored in an embedding matrix such as concrete. Thus installed, axial movement of the connected pipes due to expansion and contraction takes place between the anchor locations and is properly distributed between the various expansion joints or loops.

Where the conduit system passes through the wall of a building or other structure, such as a manhole, the outer casing is often terminated at the wall and only the fluid-conducting pipe extends beyond the inner face of the wall. It is necessary to provide a seal between the pipe and the outer casing to prevent the entry of moisture and other contaminents into the system. Where the conduit terminates a short distance from an anchor, such as five feet or less, there is little relative movement between the pipe and the casing and an end seal is frequently provided. Such an end seal conventionally comprises a plate which is fixed as by welding to both the pipe and the casing in fluid-tight relation. Where the conduit terminates more than about five feet from an anchor, the seal must permit longitudinal movement of the pipe relative to the casing. Gland seals are frequently used in such locations.

SUMMARY OF THE INVENTION

The conduit system of the present invention is comprised of a casing construction formed of reinforced plastic. The invention is particularly concerned with the provision of anchoring, conduit sealing, and casing connecting structure for conduit systems utilizing a reinforced plastic casing.

Accordingly, an object of the invention is to provide a new anchor structure particularly adapted for use in conduit systems embodying a casing formed of a reinforced plastic.

Another object of the invention is to provide a new end seal construction particularly adapted for use in conduit systems embodying a casing formed of a reinforced plastic.

A further object of the invention is to provide a new conduit seal of the type which permits relative movement between the fluid-conducting pipe and the casing of a conduit system, the seal being particularly adapted for use in connection with casings formed of a reinforced plastic.

Still another object of the invention is to provide a new structure for forming a joint connection between the casings of prefabricated conduit sections, the casings being formed of a reinforced plastic.

Other objects and a full understanding of the invention will be had by reference to the following detailed description and the accompanying drawings.

BRIEF DESCRIPTION OF THE DRAWINGS

FIG. 5 is a fragmentary elevational view partially in cross-section of a conduit system embodying another preferred seal construction for permitting relative movement between the pipe and casing.

FIG. 6 is an end elevational view of the structure shown in FIG. 5;

FIG. 7 is a fragmentary elevational view of a conduit system embodying the new casing connecting structure of this invention;

FIG. 8 is a cross-sectional view taken along the line 8—8 of FIG. 7,

DESCRIPTION OF THE PREFERRED EMBODIMENTS

Figure 1:
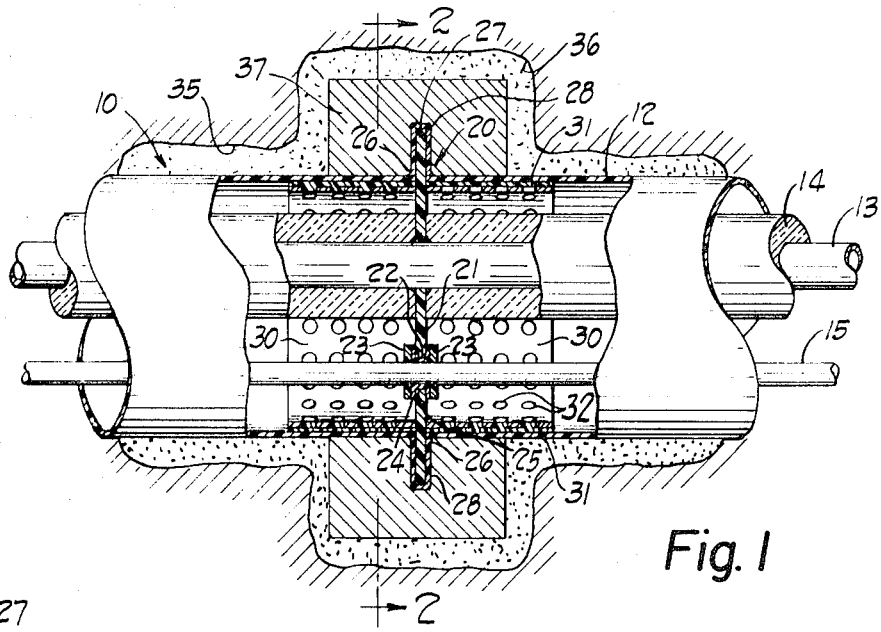
FIG. 1 is a fragmentary view, portions being broken away and shown in cross-section, of a conduit system utilizing the new anchor structure of this invention.

Referring now to the drawings, and to FIG. 1 in particular, there is shown a prefabricated section 10 of a conduit system embodying the new conduit anchor of the present invention. The illustrated conduit section 10 includes an outer casing 12 and a fluid-conducting pipe 13 within the casing. The pipe 13 is adapted to transport fluids, such as steam, chilled water or the like, and is shown as being covered by a jacket or sleeve 14 of a suitable insulating material, such as fiberglass or the like. The conduit section 10 is also shown as including a second, uninsulated pipe 15 which is spaced from the pipe 13. In accordance with conventional practice, the pipes 13, 15 are supported in spaced relation to the casing 12 by a plurality of pipe supports (not shown) which are spaced along the lengths of the pipe within the casing. The pipe supports may be of the type disclosed in U.S. Pat. No. 2,903,017, issued Sept. 8. 1959 to V. Cotman, Jr.

It is to be understood that a complete conduit system will include as many of the described sections 10 as are required and that these sections may include any desired number of fluid-conducting pipes. During installation, the several prefabricated sections of conduit are aligned end-to-end and the adjacent ends of the pipes connected to provide continuous flow passages. The adjacent ends of the casing sections are preferably connected around the pipe joints by connector structure hereinafter described in detail.

In accordance with the present invention, the casing 12 is non-metallic and is preferably made of a filament reinforced plastic. The preferred casing construction is formed by a thermo-setting resin, such as an epoxy or polyester resin, which is reinforced by glass fiber strands.

A conduit anchor 20 is provided for restraining the components of the conduit section against axial or longitudinal movement. The anchor 20 is comprised of a plate 21 having holes through which the pipes 13, 15 extend. As shown, the plate 21 is welded to the pipe 13 around the circumference of the pipe. The insulating jacket or sleeve 14 is formed in two sections, the adjacent ends of which abut the faces of the plate 21.

The hole 22 in the plate 21 through which the pipe 15 extends is of larger diameter than the pipe, whereby the pipe and plate are out of contact with each other. The structure for connecting the pipe 15 to the plate 21 includes a pair of rings 23 which are fixed to the pipe 15 on opposite sides of the plate 21. A washer 24 formed of an insulating material, such as silicone mica, asbestos or the like, is disposed between each of the rings 23 and the plate 21, and a ring 25 of insulating material is provided around the pipe 15 within the hole 22. The washers 24 and the ring 25 serve to thermally and electrically insulate the pipe 15 from the plate 21.

It is to be understood that, if desired, the plate 21 can be connected to the pipe 13 by thermal and electrical insulating structure identical to that provided between the plate and the pipe 15. Alternatively, the plate 21 can be welded to the pipe 15 in the same manner as to the pipe 13.

The casing 12 is shown as being formed in two axially spaced sections having their adjacent ends chemically welded or bonded to the opposite faces of the plate 21. Preferably, the ends of the casing sections 12 are peripherally bonded by an epoxy cement 26 to the faces of the plate 21 in order to contribute to an absolute seal against the entrance of moisture at the juncture of the casing sections and the anchor plate. At least two opposite end portions of the anchor plate 21 extend outwardly beyond the casing 12 for attachment to a fixed support. As shown, the projecting portions 27 of the anchor plate 21 are coated with a protective covering 28 of epoxy resin or the like to protect the anchor plate portions against corrosion and to further guard against the entry of moisture into the casing.

Figure 9:
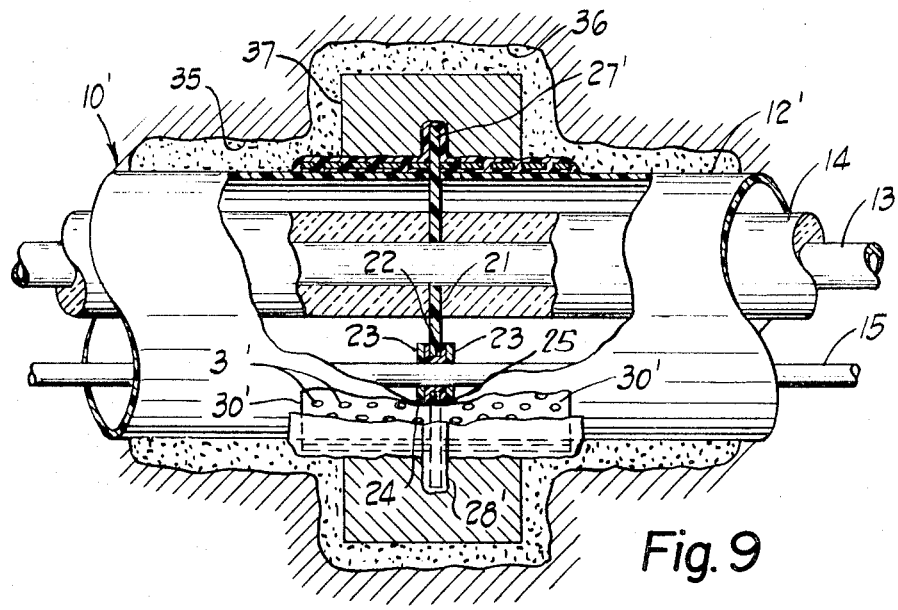
FIG. 9 is a fragmentary view similar to FIG. 1 showing a conduit system utilizing the new anchor structure according to another embodiment of this invention.

In accordance with the invention, the ends of the casing sections 12 which are joined to the anchor plate 21 are strengthened and further sealed by a pair of reinforcing and sealing sleeves 30. The sleeves 30 are disposed in axial alignment on opposite sides of the anchor plate 21 and are secured thereto by peripheral welds. The sleeves 30 extend within the casing 12 adjacent to its inner surface and are cemented thereto by an epoxy resin 31 or the like. Alternatively, the sleeves 30 may be disposed around and bonded to the outer surfaces of the casing sections 12, as in the conduit section 10' shown in FIG. 9. The bond provided by the epoxy resin 31 preferably extends the length of each sleeve 30. Each of the sleeves 30 may be provided with holes 32 to assure a strong cemented connection between the sleeve and the casing. In addition to serving as reinforcing and sealing members, the sleeves 30 dissipate the heat from the anchor plate 21 over a substantial length of the casing 12 and prevent heat concentrations in the ends of the casing sections which abut the anchor plate.

In FIG. 1, the conduit section 10 is shown installed in a ditch 35 which is enlarged at 36 around the intermediate portion of the conduit section and the anchor plate 21. A block 37 of concrete or the like is cast in the enlarged ditch portion 36 so as to completely surround the conduit section 10 with the projecting portions 27 of the anchor plate 21 being embedded therein.

Figure 3:
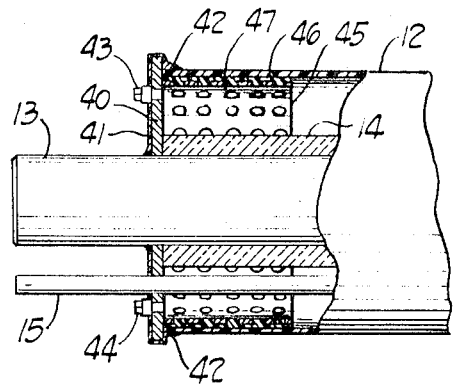
FIG. 3 is a fragmentary, elevational view partially in cross-section of a conduit system embodying the new end seal of this invention.

Reference is now made to FIG. 3 which illustrates an end seal for closing the ends of a run of conduit formed by the prefabricated sections 10. The illustrated end seal is suitable for use at the ends of conduit runs which terminate close to an anchor, for example, five feet or less, so that there is little or no relative movement between the pipe and the casing.

The end seal construction shown in FIG. 3 includes a plate 40 which is suitably secured to the end of the casing 12. The external surfaces of the plate 40 are preferably coated with epoxy resin 41 or the like to protect the plate against corrosion. The plate 40 is peripherally bonded by epoxy cement 42 to the outside of the casing 12. The plate 40 may be provided with conventional vent and drain plugs 43, 44, respectively. The pipes 13, 15 extend through holes in the plate 40 and are peripherally welded thereto. The insulating jacket or sleeve 14 around the pipe 13 terminates adjacent the inner face of the plate 40.

Figure 2:
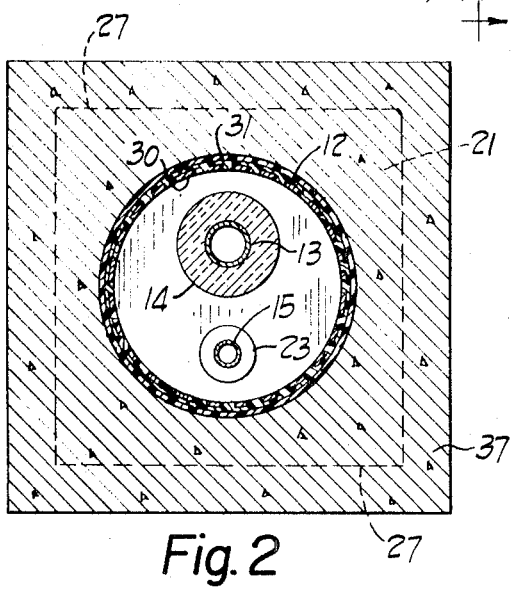
FIG. 2 is a cross-sectional view taken along the line 2—2 of FIG. 1.

In accordance with this invention, the end seal for the casing 12 includes a sealing and reinforcing sleeve 45 which is similar to the sleeves 30 described above in connection with the embodiment of FIGS. 1 and 2. The sleeve 45 has one end welded to the inside face of the plate 40 and extends along either the inside or the outside of the casing adjacent to its surface. As shown in FIG. 3, the sleeve 45 is bonded to the inside of the casing 12 by epoxy cement 46 which preferably extends the length of the sleeve. The sleeve 45 may be formed with holes 47 to assure a strong bonded joint between the sleeve and the casing.

Figure 10:
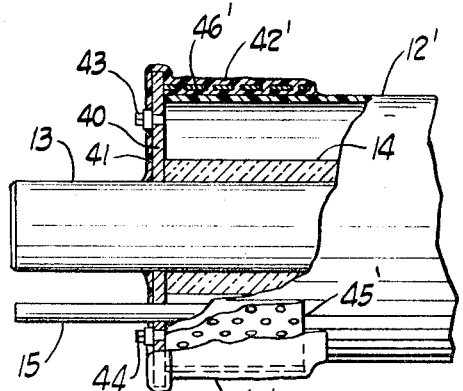
FIG. 10 is a fragmentary view similar to FIG. 3 showing a conduit system which includes a modified embodiment of the new end seal of this invention.

FIG. 10 shows an end seal construction similar to that of FIG. 3 except that the sleeve 45' is bonded to the outside of the casing 12'.

Figure 4:
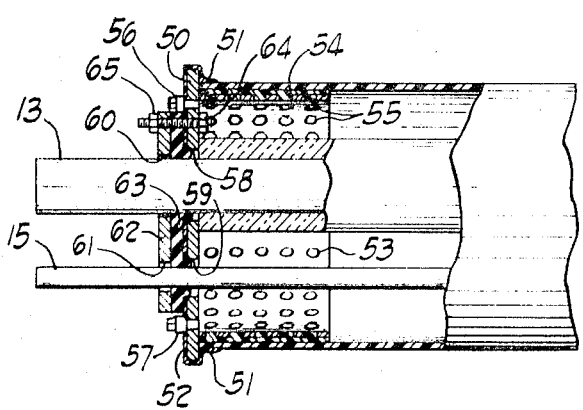
FIG. 4 is a fragmentary elevational view partially in cross-section of a conduit system embodying a new seal of this invention which permits relative movement between the pipe and the outer casing.
Figure 11:
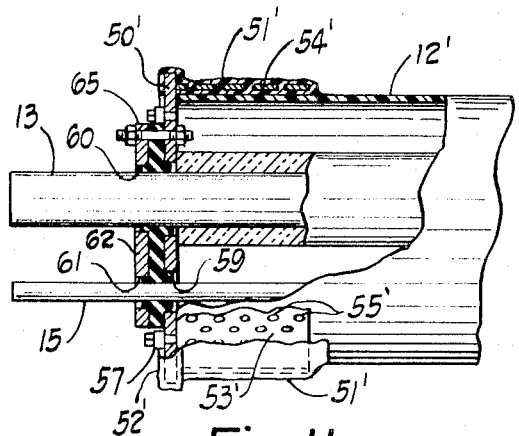
FIG. 11 is a fragmentary view similar to FIG. 4 showing a modified embodiment of the new seal of this invention which permits relative movement between the pipe and the outer casing.

FIG. 4 illustrates a seal construction of a type which permits longitudinal expansion and contraction of the fluid-conducting pipes relative to the casing. Such seals are used in locations where the conduit runs terminate five feet or more from an anchor point and where the conduit runs terminate at expansion joints. Referring to FIG. 4, the illustrated seal construction comprises a plate 50 which is peripherally bonded to the outside of the casing 12 by epoxy cement 51. As in the embodiment of FIG. 3, the plate 50 is coated with epoxy resin 52 to prevent corrosion of the plate and to guard against the entrance of moisture at the juncture between the plate and the casing. A reinforcing and sealing sleeve 53 is welded to the inner face of the plate 50 and extends along the casing 12 adjacent its surface. The sleeve 53 is bonded to the adjacent surface of the casing 12 by epoxy cement 54. As in the previously described embodiments of the invention, the sleeve 53 may extend adjacent the inner surface of the casing 12 as shown in FIG. 4 or it may extend adjacent the outer surface of the casing as shown in FIG. 11. Holes 55 are provided in the sleeve 53 to assure a strong bonded connection between the sleeve and the casing. Conventional vent and drain plugs 56, 57, respectively, are provided in the plate 50.

The pipes 13, 15 project through holes 58, 59, respectively, in the plate 50. The pipes 13, 15 also extend through holes 60, 61, respectively, in a second plate 62, which is spaced from the outer surface of the plate 50. A sealing gasket 63 formed of a suitable material, such as rubber or the like, is disposed between the two plates 50, 62. The plates 50, 62 are secured together by bolts 64 and cooperating nuts 65. During installation of the seal, the nuts 65 are drawn tightly on the bolts 64 to draw the plates together and compress the intermediate gasket 63 to provide a fluid-tight seal between the plates and around the pipes 13, 15. The plate 62 is preferably formed of plastic so that it will be corrosion resistant.

Figure 12:
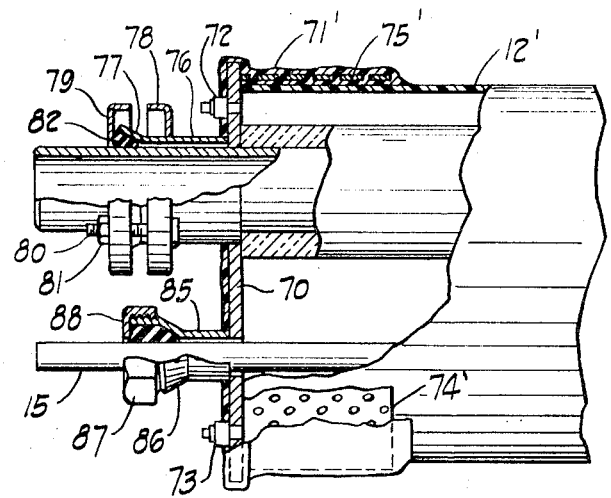
FIG. 12 is a fragmentary view similar to FIG. 5 showing a conduit system embodying still another preferred seal construction for permitting relative movement between the pipe and casing.

Another preferred seal construction for permitting longitudinal movement of the fluid-conducting pipes relative to the casing is illustrated in FIGS. 5 and 6. As shown, the seal comprises a resin-coated plate 70 which is peripherally bonded to the casing 12 by epoxy cement 71. Conventional vent and drain plugs 72, 73, respectively are provided in the plate 70. A reinforcing and sealing sleeve 74 has one end welded to the inner face of the plate 70 and extends along either the inside or the outside of the casing 12 adjacent to its surface. FIG. 5 shows the sleeve 74 adjacent the inner surface of the casing 12, and FIG. 12 illustrates a similar seal construction except that the sleeve extends along the outer surface of the casing. The sleeve 74 is bonded throughout its length to the casing 12 by epoxy cement 75. If desired, the sleeve 74 may be provided with holes in the same manner as the sleeve 53 described above in connection with the embodiment of FIG. 4.

A gland type seal is provided in association with each of the fluid-conducting pipes 13, 15. The gland seal in association with the pipe 13 comprises a sleeve 76 which is welded to the outside of the plate 70 around the pipe 13 and which extends axially of the pipe away from the plate. The end portion 77 of the sleeve 76 which is remote from the plate 70 is flared outwardly. A coupling ring 78 is welded to the sleeve 76 at a location spaced between the plate 70 and the flared end portion 77. A second coupling ring 79 is disposed adjacent the flared end portion 77 and the two coupling rings are connected by bolts 80 and cooperating nuts 81. A sealing gasket 82 is disposed between the ring 79 and the flared end portion 77 so that the gasket will be compressed into fluid-tight sealing engagement with the pipe 13 when the nuts 81 are tightened on the bolts 80.

The gland seal associated with the pipe 15 comprises a sleeve 85 having one end welded to the outer face of the plate 70 around the pipe 15. The sleeve 85 extends axially of the pipe 15 and the end portion 86 of the sleeve is flanged outwardly and is externally threaded. A ring 87 is threaded on the flanged portion 86 to compress a gasket 88 in fluid-tight sealing engagement around the pipe 15.

Reference is now made to FIGS. 7 and 8 which illustrate a preferred manner of connecting the ends of the casings of two adjacent conduit sections 10, 10'. The casings 12, 12' of the sections 10, 10', respectively, are spaced apart so that the projecting end portions of the pipes 13, 13' and 15, 15' can be welded or otherwise secured together. A longitudinally split connector band 90 extends between and around the spaced end portions of the casings 12, 12'. The wall thickness of the connector band 90 preferably is at least equal to the wall thickness of the casing sections 12, 12'. As best shown in FIG. 8, one longitudinal edge portion 91 of the split connector band 90 is feathered or tapered and is overlapped by the other longitudinal edge 92 of the connector band. The two longitudinal edges 91, 92 of the connector band 90 are secured together at 93 by an epoxy or polyester cement or the like. The connector band 90 is secured to the casing sections 12, 12' by peripheral bonds 94 of an epoxy or polyester cement or the like at the ends of the band, and by bonding or cementing to the casing sections the overlapping end portions of the connector band.

When forming the joint illustrated in FIGS. 7 and 8, the pipe ends 13, 13' and 15, 15' are placed in abutting relation and are connected together. The connector band 90 is then placed around the end portions of the casings 12, 12' to cover the pipe joints and the longitudinal edges and the ends of the connector band are secured in the manner shown.

It will be apparent from the foregoing description that the invention has provided new anchoring and conduit sealing structure particularly adapted for use in connection with relatively thin walled plastic casing. The anchor construction and each embodiment of the conduit seal structure is characterized by the use of a reinforcing and sealing sleeve which extends along either the inside or outside of the end portion of the conduit casing and is bonded to its surface. The reinforcing and sealing sleeve strengthens the casing in the areas of the anchor and seal which are subjected to stresses, and also dissipates heat from the anchor over a large area of the casing. The bond between the sleeve and the casing preferably extends throughout the length of the sleeve so as effectively to prevent any moisture or other contaminants from entering the casing. It will also be seen that the invention provides a new, relatively simple manner of connecting the ends of plastic casing to form a continuous conduit run.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:

1. A conduit for use in a fluid piping system comprising:
   a. plastic casing means comprising two axially spaced casing sections,
   b. a fluid-conducting pipe supported within and extending through said casing means,
   c. said casing means having ends adjacent ends of said pipe, said ends of said casing means adapted to be connected to the ends of a casing means of another conduit during assembly of a piping system,
   d. an anchor plate connected directly to the outside of said pipe between said casing sections,
   e. said plate lying in a plane transverse to the axis of said pipe and extending outwardly beyond said casing sections,
   f. said casing sections having ends abutting said plate,
   g. means forming a fluid-tight, bonded connection between said plate and the abutting ends of said casing sections,
   h. a pair of reinforcing sleeves connected to opposite faces of said plate,
   i. each of said sleeves extending longitudinally of a respective casing section adjacent to its surface, and
   j. means bonding said sleeves directly to said casing sections and forming a fluid-tight seal between said casing sections and said sleeves.

2. A conduit as claimed in claim 1 wherein said reinforcing sleeves extend within said casing sections.

3. A conduit as claimed in claim 1 wherein said means bonding said sleeves to said casing sections comprises a synthetic resin.

4. A conduit system comprising a plastic casing, a fluid-conducting pipe extending within said casing, and structure sealing the end of said casing around said pipe, said structure including a plate, means forming a peripheral seal between said plate and said casing, a reinforcing and sealing sleeve fixed to said plate and extending longitudinally within said casing adjacent to its inner surface, said sleeve having holes therethrough, means forming a fluid-tight bonded connection between said inner surface of said casing and said sleeve, and means forming a seal between said plate and said pipe.

5. A conduit system as claimed in claim 4 wherein said means forming a seal between said plate and said pipe comprises a ring surrounding said pipe and spaced from the outer surface of said plate, a sealing gasket engaged with said plate and said ring, and means connecting said ring and plate together for compressing said gasket to form a fluid-tight seal therebetween and around said pipe.

6. A conduit system as claimed in claim 4 wherein said means forming a seal between said plate and said pipe comprises a tubular member fixed to said plate and extending longitudinally around said pipe, a sealing gasket at the end of said member remote from said plate, and means cooperating with said member for compressing said gasket into fluid-tight sealing engagement with the outer surface of said pipe.

7. A conduit for use in a fluid piping system comprising:
   a. a plastic casing,
   b. a fluid-conducting pipe supported within and extending through said casing,
   c. said casing having at least one end which is adapted to be connected to an end of a casing of another conduit during assembly of a piping system,
   d. a plate lying in a plane transverse to the axis of said pipe,
   e. means forming a seal between said plate and the outside of said pipe,
   f. means forming a fluid-tight bonded connection between said casing and said plate,
   g. a metal reinforcing sleeve connected to said plate,
   h. said sleeve extending longitudinally of said casing adjacent to its surface,
   i. said sleeve having a plurality of holes therethrough, and,
   j. means bonding said sleeve to said casing and forming a fluid-tight seal between said casing and said sleeve,
   k. said bonding means comprising a synthetic resin between said sleeve and said casing and filling said holes of said sleeve to assure a strong bonded connection.

8. A conduit as claimed in claim 7, wherein said plate extends outwardly of said casing.

9. A fluid piping system comprising:
   a. a plurality of conduits,
   b. each of said conduits including a plastic casing and a fluid-conducting pipe supported within and extending through said casing,
   c. said pipes of adjacent conduits having their ends connected together to form a continuous flow passage,
   d. said casings of adjacent conduits having end portions disposed in axially spaced relation,
   e. means connecting said axially spaced end portions of said casings,
   f. at least one of said conduits having a casing formed in two sections,
   g. each of said casing sections having an end connected to an end of a casing of an adjacent conduit and an end disposed in axially spaced relation to an end of the other casing section,
   h. an anchor plate connected to the outside of the pipe of said one conduit between said casing sections,
   i. said plate lying in a plane transverse to the axis of the pipe of said one conduit and extending outwardly beyond said casing sections,
   j. said casing sections having ends abutting said plate,
   k. means forming a fluid-tight bonded connection between said plate and the abutting ends of said casing sections,
   l. a pair of metal reinforcing sleeves connected to opposite faces of said plate,
   m. each of said sleeves extending longitudinally of a casing section adjacent to its surface,
   n. a synthetic resin bonding said sleeves to said casing sections and forming a fluid-tight seal between said casing sections and said sleeves, and
   o. structure sealing an end of a casing of a conduit around the pipe thereof.

10. A fluid piping system as claimed in 9 wherein said structure sealing an end of a casing comprises an end plate, means forming a peripheral seal between said end plate and the casing, a reinforcing and sealing sleeve fixed to said end plate and extending longitudinally of the casing adjacent its surface, means forming a fluid-tight bonded connection between said sleeve and the adjacent surface of the casing, and means forming a seal between said end plate and the pipe within the casing.

11. A fluid piping system as claimed in claim 9 wherein said means connecting said axially spaced end portions of at least two adjacent casings comprises a connector band extending between and around the end portions of the adjacent casings, said connector band having a first longitudinal tapered edge and a second longitudinal edge disposed in overlapping relation with said first edge and bonded thereto, and means forming fluid-tight peripheral seals between the ends of said connector band and the spaced end portions of the adjacent casings.

12. A conduit for use in a fluid piping system comprising:
   a. plastic casing means comprising two axially spaced casing sections,
   b. a fluid-conducting pipe supported within and extending through said casing means,
   c. said casing means having ends adjacent ends of said pipe, said ends of said casing means adapted to be connected to the ends of a casing means of another conduit during assembly of a piping system,
   d. an anchor plate connected to the outside of said pipe between said casing sections,
   e. said plate lying in a plane transverse to the axis of said pipe and extending outwardly beyond said casing sections,
   f. said casing sections having ends abutting said plate,
   g. means forming a fluid-tight, bonded connection between said plate and the abutting ends of said casing sections,
   h. a pair of reinforcing sleeves connected to opposite faces of said plate,
   i. each of said sleeves extending longitudinally of a respective casing section about its outer periphery, and
   j. means bonding said sleeves to said respective casing sections and forming a fluid-tight seal about said casing sections between said casing sections and said sleeves.

13. A conduit as claimed in claim 12 wherein said means bonding said sleeves to said casing sections comprises a synthetic resin.

14. A conduit as claimed in claim 15 wherein each of said sleeves is provided with a plurality of holes through its wall, said synthetic resin filling said holes to assure a strong bonded connection between the sleeve and the adjacent casing section.

15. A conduit as claimed in claim 13 wherein said synthetic resin is provided along the entire length of each sleeve.

16. A fluid piping system comprising:
   a. a plurality of conduits,
   b. each of said conduits including a plastic casing and a fluid-conducting pipe supported within and extending through said casing,
   c. said pipes of adjacent conduits having their ends connected together to form a continuous flow passage,
   d. said casings of adjacent conduits having end portions disposed in axially spaced relation,
   e. means connecting said axially spaced end portions of said casings,
   f. at least one of said conduits having a casing formed in two sections,
   g. each of said casing sections having an end connected to an end of a casing of an adjacent conduit and an end disposed in axially spaced relation to an end of the other casing section,
   h. an anchor plate connected to the outside of the pipe of said one conduit between said casing sections,
   i. said plate lying in a plane transverse to the axis of the pipe of said one conduit and extending outwardly beyond said casing sections,
   j. said casing sections having ends abutting said plate,
   k. means forming a fluid-tight bonded connection between said plate and the abutting ends of said casing sections,
   l. a pair of metal reinforcing sleeves connected to opposite faces of said plate,
   m. each of said sleeves extending longitudinally of a respective casing section about its outer periphery,
   n. a synthetic resin bonding said sleeves to said respective casing sections and forming a fluid-tight seal between said sleeves and respective casing sections, and
   o. structure sealing an end of a casing of a conduit around the pipe thereof.

17. A conduit system comprising a plastic casing, a fluid-conducting pipe extending within said casing, and structure sealing the end of said casing around said pipe, said structure including a plate, means forming a peripheral seal between said plate and said casing, a reinforcing and sealing sleeve fixed to said plate and extending longitudinally about said casing adjacent its outer surface, said sleeve having holes therethrough, means forming a fluid-tight bonded connection between said outer surface of said casing and said sleeve, and means forming a seal between said plate and said pipe.

18. A conduit for use in a fluid piping system comprising:
   a. plastic casing means comprising two axially spaced casing sections,
   b. a fluid-conducting pipe supported within and extending through said casing means,
   c. said casing means having ends adjacent ends of said pipe, said ends of said casing means adapted to be connected to ends of a casing means of another conduit during assembly of a piping system,
   d. an anchor plate connected to the outside of said pipe between said casing sections,
   e. said plate lying in a plane transverse to the axis of said pipe and extending outwardly beyond said casing sections,
   f. said casing sections having ends abutting said plate,
   g. means forming a fluid-tight, bonded connection between said plate and the abutting ends of said casing sections,
   h. a pair of reinforcing sleeves connected to opposite faces of said plate,
   i. each of said sleeves extending longitudinally of a respective casing section adjacent to its surface, and
   j. means comprising a synthetic resin bonding said sleeves to said casing sections and forming a fluid-tight seal between said casing sections and said sleeves, k. said synthetic resin being provided along the entire length of each of said sleeves.

19. A conduit for use in a fluid piping system comprising:
   a. plastic casing means comprising two axially spaced casing sections,
   b. a fluid-conducting pipe supported within and extending through said casing means,
   c. said casing means having ends adjacent ends of said pipe, said ends of said casing means adapted to be connected to the ends of casing means of another conduit during assembly of a piping system,
   d. an anchor plate connected to the outside of said pipe between said casing sections,
   e. said plate lying in a plane transverse to the axis of said pipe and extending outwardly beyond said casing sections,
   f. said casing sections having ends abutting said plate,
   g. means forming a fluid-type, bonded connection between said plate and the abutting ends of said casing sections,
   h. a pair of reinforcing sleeves connected to opposite faces of said plate,
   i. each of said sleeves extending longitudinally of a respective casing section adjacent to its surface, and
   j. means comprising a synthetic resin bonding said sleeves to said casing sections and forming a fluid-type seal between said casing sections and said sleeves,
   k. each of said sleeves being provided with a plurality of holes through its wall, said synthetic resin filling said holes to assure a strong bonded connection between each sleeve and the adjacent casing section.

* * * * *